J. Bird,
Differential Pulley.
No. 48,044.      Patented June 6, 1865.

Witnesses.      Inventor.

UNITED STATES PATENT OFFICE.

JAMES BIRD, OF NEW YORK, N. Y.

IMPROVEMENT IN HOISTING-MACHINES.

Specification forming part of Letters Patent No. 48,044, dated June 6, 1865.

*To all whom it may concern:*

Be it known that I, JAMES BIRD, of the city, county, and State of New York, have invented a new and useful Improvement in Hoisting-Machines; and I do hereby declare that the following is a full, clear, and exact description thereof, which will enable others skilled in the art to make and use the same, reference being had to the accompanying drawings, forming part of this specification, in which—

Figure 1:
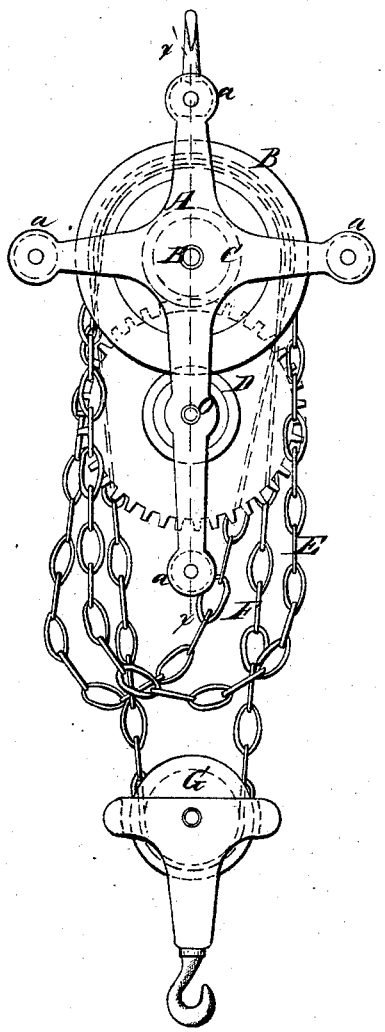
Figure 2:
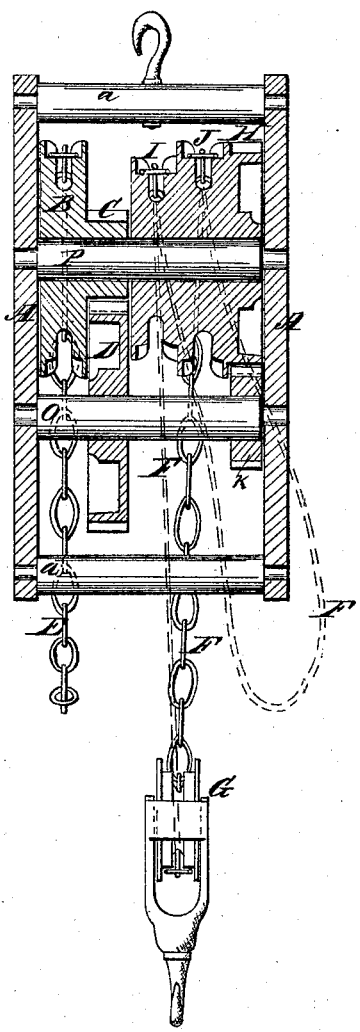

Figure 1 is a side view of a hoisting-machine made according to my invention. Fig. 2 is an elevation of a section taken on the vertical line $x$ of Fig. 1.

Similar letters of reference indicate like parts.

A represents the frame of the apparatus, made in this example of two sides, each in the form of a cross, the ends of its arms being united by cross-pieces $a$.

P is a shaft fixed or keyed in the sides of the frame, so that it shall not rotate. It carries two sets of pulleys and gear-wheels, all loose on the shaft, one set on the left-hand side, B C, and the other, H J I, on the right-hand side. The pulley B has sprockets formed in a circumferential groove made in its periphery, which take hold of the links of an endless chain, E, by which the pulley is rotated.

C is a gear-wheel, of small diameter, placed on the same shaft, and cast with or otherwise firmly united to the pulley B. The chain E, by which the pulley and its attached gear-wheel are rotated, is to be long enough to reach the operator.

O is a shaft, also sustained by the frame A; but it is capable of rotation in bearings made in its sides. It carries two gear-wheels, which are firmly fixed thereon. One of them, D, of large diameter, engages with the gear C of pulley B, and the other, K, of small diameter, engages the gear H. The pulleys J and I, which are of unequal diameter, are cast with or otherwise firmly fixed upon the side of the gear H, so that said gear and the pulleys J I rotate together.

F is a chain, which may be continuous, passed around the pulleys J and I, whose peripheries are grooved and formed with sprockets, like the pulley B. The chain F is carried, also, through a sheave, G, to whose block is attached a hook for attaching any weight or body to be lifted by the apparatus.

The operation of the apparatus is as follows: Any weight which is to be raised having been attached to the hook of the pulley-block, the operator draws the chain F and rotates the pulley B, and thereby gives motion, through the shaft O and gears C and D and the gears K and H, to the pulleys J I, the larger of which, J, takes up the chain with greater rapidity than it is delivered by the smaller one, I, and the weight becomes raised with a comparatively small outlay of power and with considerable speed, the weight being raised at each revolution of the gear H a distance equal to the difference between the circumferential lines of the said pulleys.

I disclaim the invention claimed by Samuel M. Longley in his Letters Patent of March 1, 1864, and that claimed by John James Doyle in his Letters Patent of January 8, 1861; but,

Having thus described my invention, I claim as new and desire to secure by Letters Patent—

The hoisting apparatus constructed substantially as above described, the driving-pulley and gear B C being placed on the same shaft with the hoisting-pulleys and their gear-wheel, as above set forth.

JAMES BIRD.

Witnesses:
  M. M. LIVINGSTON,
  C. L. TOPLIFF.